(12) United States Patent
Legallais

(10) Patent No.: US 7,766,645 B2
(45) Date of Patent: Aug. 3, 2010

(54) METHOD OF CONTROLLING THE OPENING AND CLOSING OF A BLOW MOLD AND BLOWING DEVICE FOR IMPLEMENTING SAME

(75) Inventor: Stéphane Legallais, Octeville sur Mer (FR)

(73) Assignee: Sidel Participations, Octeville sur Mer (FR)

( * ) Notice: Subject to any disclaimer, the term of this patent is extended or adjusted under 35 U.S.C. 154(b) by 0 days.

(21) Appl. No.: 12/466,037

(22) Filed: May 14, 2009

(65) Prior Publication Data

US 2009/0220630 A1 Sep. 3, 2009

Related U.S. Application Data

(62) Division of application No. 11/883,918, filed as application No. PCT/FR2006/000270 on Feb. 6, 2006.

(30) Foreign Application Priority Data

Feb. 8, 2005 (FR) .................................. 05 01269

(51) Int. Cl.
*B29C 49/36* (2006.01)
*B29C 49/56* (2006.01)
(52) U.S. Cl. ................. 425/540; 425/451.4; 425/451.5; 425/541
(58) Field of Classification Search ............. 425/450.1, 425/451.4, 451.5, 540, 541
See application file for complete search history.

(56) References Cited

U.S. PATENT DOCUMENTS 2,018,785 A   10/1935  Harrison
2,338,280 A *  1/1944  Brundage .................... 425/395
3,499,747 A    3/1970  Dahlman et al.
4,233,010 A * 11/1980  Suzuki ........................ 425/143
4,313,720 A    2/1982  Spurr
4,611,981 A    9/1986  English
4,771,856 A    9/1988  Hutchison et al.
5,064,366 A   11/1991  Voss
5,644,117 A    7/1997  Bolongeat-Mobleu et al.
6,053,723 A    4/2000  Guiffant et al.
2006/0172034 A1*  8/2006  Laar et al. ................ 425/451.4
2008/0220115 A1*  9/2008  Galloni ........................ 425/540

FOREIGN PATENT DOCUMENTS

DE    199 48 474 A1      4/2001
DE    10346089 A1  *    5/2005
WO    0185435 A1       11/2001

OTHER PUBLICATIONS

Partial machine translation of DE10346089A1 dated May 12, 2005 obtained from espace.net.*

* cited by examiner

*Primary Examiner*—Robert B Davis
(74) *Attorney, Agent, or Firm*—Sughrue Mion, PLLC

(57) ABSTRACT

A molding device for manufacturing thermoplastic containers by blow-molding or stretch-blow-molding heated parisons. The molding device having a blow-molding mold of the hinged mold type with at least two mold halves which can be separated from one another by rotation about a common axle of articulation under the action of an actuating device. The actuating device is designed in such a way that the two mold halves have respective angles of opening on each side of the parting plane of the mold which are not equal.

12 Claims, 3 Drawing Sheets

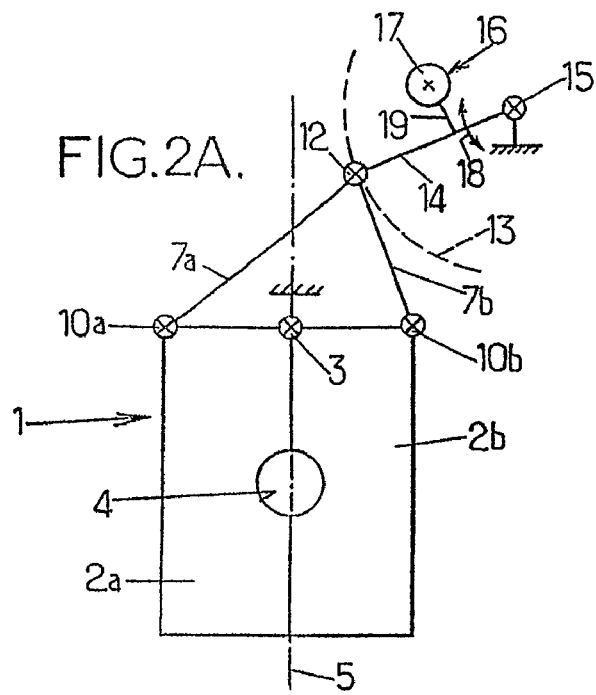
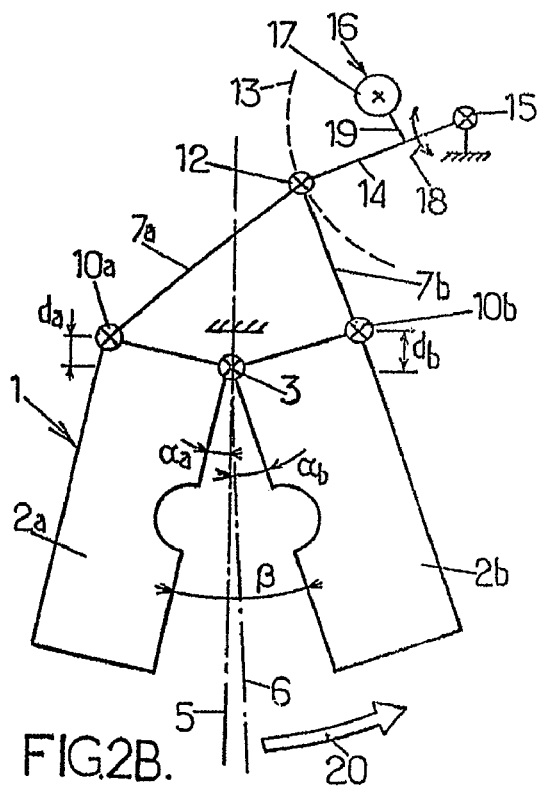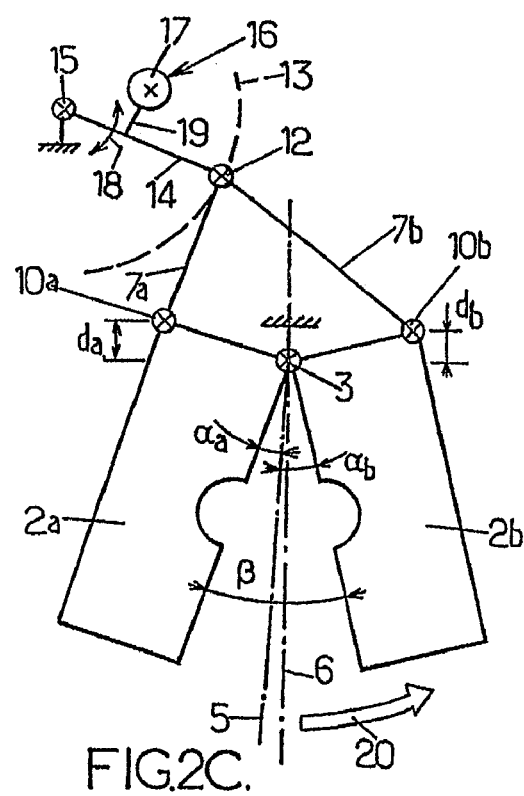
FIG.2A.
FIG.2B.
FIG.2C.

METHOD OF CONTROLLING THE OPENING AND CLOSING OF A BLOW MOLD AND BLOWING DEVICE FOR IMPLEMENTING SAME

CROSS-REFERENCE TO RELATED APPLICATION

The present application is a divisional of U.S. patent application No. 11/883,918, filed Aug. 8, 2007, which is a national stage of PCT/FR2006/000270, filed Feb. 6, 2006, both of which claim priority to Patent Application 05 01269, filed in France on Feb. 8, 2005. The entire disclosures of the prior applications are hereby incorporated by reference.

FIELD OF THE INVENTION

The present invention relates to improvements made to the field of the blow-molding of thermoplastic containers, particularly PET containers, by blow-molding or stretch-blow-molding heated parisons in a molding device comprising at least one blow-molding mold of the hinged mold type with at least two mold halves that can be separated from one another by rotation about a common axle of articulation under the action of drive means.

BACKGROUND OF THE INVENTION

In the molding devices currently in use today, the two mold halves open substantially symmetrically on each side of the parting plane, this being a solution which, from a technological standpoint, is easy to implement. For their part, insertion or loading means designed to introduce a parison into the mold and extraction means designed to extract a molded container from the mold are arranged in such a way that the movement of the gripper, in both cases, is approximately in the parting plane of the mold in the mold or in close proximity thereto.

What is more, it is commonplace for the molding device to be arranged in the form of a rotary device of the carousel type, generally equipped with a number of molds distributed about its periphery, the parting planes of these molds being substantially radial. For their part, the insertion means and the extraction means are designed in the form of rotary transfer wheels equipped with grippers supported by approximately radial arms. The time needed by the insertion means to introduce the parison radially into the mold or by the extraction means to extract the container radially from the mold means that each gripper follows the mold over a portion of the rotary path thereof, and, in addition, the gripper also has a movement with a radial component so as to enter or leave the mold, these movements having to be performed without any physical interference between the edges of the mold halves and the grippers and either the parison or the container respectively.

This results in a relatively complicated arrangement of the insertion and extraction means which are in the form of transfer wheels equipped with gripper support arms driven in a double pivoting and radial movement while the grippers may, for their part, be driven in a pivoting movement at the end of their support arms. These combined movements are obtained mechanically through complex collections of rollers collaborating with fixed cams, and mean that the surroundings of the rotary carousel are very cluttered. In addition, these assemblies cause significant mechanical friction as well as some degree of rebound, and this limits the rate at which the installations can operate.

Recently, simplified structures have been proposed, these resorting to an arrangement of one-piece gripper and support arm assemblies driven in a single pivoting movement, thus considerably simplifying the controls and removing an appreciable amount of clutter from the immediate confines of the rotary carousel while at the same time allowing appreciably increased operating rates. However, this simplification has only been able to be achieved at the expense of a misalignment which, while admittedly small, is nonetheless real enough, between the axis of the parison or of the container and the parting plane of the mold at the beginning of insertion or, respectively, at the end of extraction. In other words, the movements of the gripper during insertion of the parison and during extraction of the container are now performed in arcs of a circle, rather than strictly radially. This may, at least in certain operating configurations, lead to the risk of physical interference between the edge of one of the mold halves and the gripper and/or the parison or container respectively.

Admittedly, one solution might have been to increase the angle of opening of the molds with respect to the angle of opening actually used. However, there are at least two reasons why such a solution would not prove satisfactory.

One first reason is that opening a mold through a larger angle leads to an increase in the time needed for the steps of opening and closing the mold, and this goes against the current demands of users who are wanting increasingly short times in order to increase production rates.

Another reason is that an increased angle of opening of the molds involves more available space and therefore entails spacing the molds further apart at the periphery of the carousel. That can be achieved only by increasing the diameter, and therefore the inertia, of the carousel which is something which, once again, would go against the current demands of users who are requiring increasingly compact machines and increasingly high production rates. Furthermore, a carousel of a larger diameter would be more expensive.

SUMMARY OF THE INVENTION

It is an object of the present invention to propose solutions capable of avoiding such physical interferences while at the same time resorting to structures that are simple, uncomplicated to implement, and therefore significantly less expensive but capable of allowing an increase in production rates.

To these ends, according to a first of its aspects, the invention proposes a method for controlling the opening and closing of a blow-molding mold of the hinged mold type for the manufacture of thermoplastic containers, particularly PET containers, by blow-molding or stretch-blow-molding heated parisons, said mold comprising at least two mold halves that can be separated from one another by rotation about a fixed common axle of articulation, which method is, according to the invention, characterized in that the two mold halves are opened asymmetrically on each side of the parting plane.

By virtue of this arrangement, the widest-open mold half leaves more space for the introduction into the mold of an auxiliary member such as a gripper, while at the same time, as will become more clearly apparent later on, the means of achieving this are simple. In other words, the solution proposed by the invention consists in causing the plane of symmetry of the mold to pivot so that it as closely as possible accompanies the means associated with the mold in order to supply the parison or take away the molded container in such a way that these move approximately along this plane of symmetry rather than along the parting plane of the mold which, in this configuration, no longer coincides with the plane of symmetry except when the mold is in the closed position.

It will be emphasized that, in the context of the invention, it is possible for the mold to keep its customary angle of opening, or in other words, on the one hand, not to alter the time needed for the operations of opening and closing the mold so that the production rates are not adversely affected and, on the other hand, not to alter the space needed for opening, because in fact one mold half is moved further and the other is moved less than in the case of the solutions hitherto employed. Furthermore, the available option to employ parison/container movement means of a simplified type in combination with the process of asymmetric mold opening allows production rates to be increased.

According to a first possible solution, provision is made for the two mold halves to be controlled individually so that they open asymmetrically on each side of the parting plane. This then is the simplest solution in terms of the principles employed, but on the other hand doubling-up on the control means leads to greater bulk and greater cost.

A second possible solution involves the case where the two mold halves are controlled jointly by means of two respective link rods having first ends coupled rotationally to the respective mold halves and second ends coupled rotationally to one another at a common axle that can move approximately parallel to the parting plane. In this case, according to the invention, provision is made for the two link rods to have different lengths and for the common axle to be moved external to the parting plane, the difference in length of the link rods being related to the difference in the asymmetric angles of opening of the two respective mold halves on each side of the parting plane.

A third possible solution involves the case where the two mold halves are controlled jointly via two respective link rods of substantially the same length and having first ends coupled rotationally to the respective mold halves and second ends coupled rotationally to one another at a movable common axle. In this case, provision is made for said common axle to be able to move in a direction that is inclined with respect to the parting plane, the angle of this inclination being related to the asymmetry of opening of the two mold halves on each side of the parting plane.

The second and third solutions proposed according to the invention prove to be remarkably advantageous in that the drive means provided in current molding devices are partially retained, in that the molds are unaffected by the implementation of these solutions and in that, ultimately, the modifications to be made to current molding devices are relatively small.

In practice, the arrangements according to the invention look likely to find optimum working conditions when the mold belongs to a rotary molding device of the carousel type and when the parting plane of the mold runs substantially along a radius of the molding device. In this case in particular, with a view to use in the Applicant Company's current machines paying consideration to the respective arrangements of the molds and of the means for inserting the parisons and the means for extracting the molded containers, it then becomes advantageous that, for example for inserting the parison into the mold, it is the rear mold half (considered in the direction in which the molding device rotates) that has an angle of opening greater than that of the front mold half; just as, for example, for extracting the molded container, it is the front mold half (considered in the direction in which the molding device rotates) that has an angle of opening greater than that of the rear mold half.

According to a second of its aspects, the invention proposes a molding device for manufacturing thermoplastic containers, particularly PET containers, by blow-molding or stretch-blow-molding heated parisons, said molding device comprising at least one blow-molding mold of the hinged mold type with at least two mold halves which can be separated from one another by rotation about a common axle of articulation under the action of drive means, said molding device being intended for implementing the method explained hereinabove, which molding device, being arranged according to the invention, is characterized in that the actuating means are designed in such a way that the two mold halves have respective angles of opening on each side of the parting plane of the mold which are not equal.

A first possible solution may consist in the actuating means comprising two distinct actuating means each functionally associated with a respective one of the two mold halves, and in these two actuating means being functionally associated with individual controls, independent of one another, so as to define respective angles of opening of the two mold halves one on each side of the parting plane which are not equal. This solution has the benefit of leaving many options as to the controls of the two mold halves, but doubling up on the means may, in general, be deemed to be too expensive.

A second possible solution may find an application when the actuating means comprise two link rods having first ends rotationally connected respectively to the two mold halves and second ends rotationally connected at a common axle and means for driving said common axle capable of moving it in a path running approximately parallel to the parting plane. In that case, according to the invention, provision is made for the two link rods to have different lengths and for the path of the common axle to be external the parting plane, the mold half driven by the shorter link rod having an angle of opening, with respect to the parting plane, which is larger than that of the other mold half.

In a concrete embodiment, provision may be made for the drive means to comprise a drive arm running approximately perpendicular to the parting plane and for this drive arm to have a first end articulated to a fixed axle and an opposite second end articulated to said axle common to the aforesaid link rods.

A third possible solution may find an application when the actuating means comprise two link rods of substantially the same length and having respective first ends rotationally connected to the two mold halves respectively and opposite second ends rotationally connected at a common axle, drive means being functionally associated with said common axle in order to move it. In this case, according to the invention, provision is made for said drive means for driving the common axle to be designed to drive said common axle in a path running approximately transversely to the parting plane and inclined at an angle with respect thereto, the angle of inclination of this path being related to the asymmetry of opening of the two respective mold halves.

In a concrete embodiment, provision may be made for the drive means to comprise a drive arm running approximately transversely to the parting plane but inclined at an angle with respect thereto, and for this drive arm to have a first end articulated to a fixed axle and an opposite second end articulated to said axle common to the aforesaid link rods.

Whatever the solution adopted, the provisions according to the invention may find a particularly beneficial application in a molding device built in the form of a rotary device of the carousel type, the parting plane of the mold running substantially radially. In this case, in order to equip most of the molding devices of the Applicant Company, it is advantageous, when introducing a parison into the mold, for it to be the rear mold half (considered in the direction in which the carousel rotates) which has an angle of opening, with respect to the parting plane, which is greater than that of the other mold half; just as, in order to extract a molded container from the mold, it is likewise advantageous for it to be the front mold half (considered in the direction in which the carousel rotates) which has an angle of opening, with respect to the parting plane, which is greater than that of the other mold half.

BRIEF DESCRIPTION OF THE DRAWINGS

The invention will be better understood from reading the detailed description which follows of certain preferred embodiments which are given solely by way of nonlimiting examples. In this description, reference is made to the attached drawings in which:

FIG. 2A is a highly schematic depiction, in a view from above, of a second embodiment of a molding device arranged according to the invention;

FIGS. 2B and 2C are depictions similar to that of FIG. 2A, showing the mold, when it belongs to a rotary device of the carousel type, in two different functional positions;

DETAILED DESCRIPTION OF THE INVENTION

In the attached drawings, the molding device at which the invention is aimed is depicted highly schematically and only those parts or elements that are useful in understanding the invention are illustrated, it being understood that the molding device may be configured in any way compatible with the provisions proposed in the context of the invention.

Figure 1A:
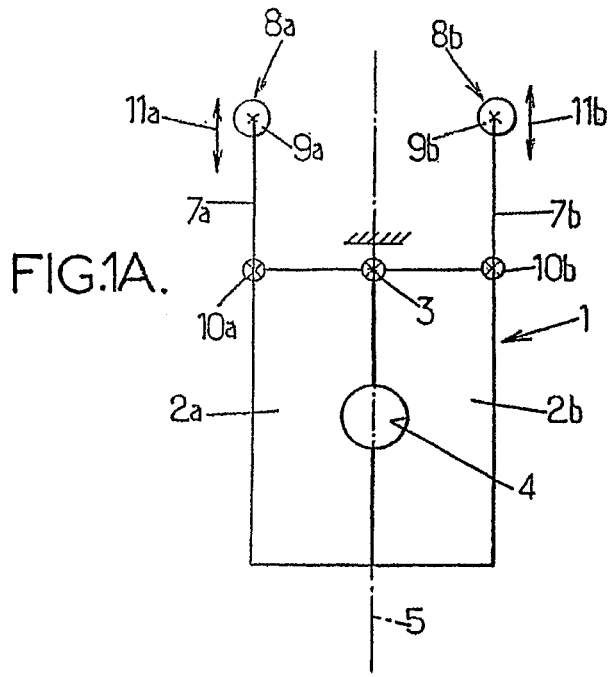
FIG. 1A is a highly schematic depiction, in a view from above, of a first embodiment of a molding device arranged according to the invention.

Thus, it is an object of the invention to improve the control to open and close a blow-molding mold, illustrated in a view from above in FIG. 1A in the closed position and denoted in its entirety by the reference 1, of the hinged mold type, intended for the manufacture of thermoplastic containers, particularly PET containers, using a process of blow-molding or stretch-blow molding heated parisons. A mold 1 such as this comprises at least two mold halves 2a, 2b which can be separated from one another angularly by rotation about a fixed common axle of articulation 3. The mold halves have respective hollow impressions which, together, define a cavity 4 (only the top opening of which is visible in FIG. 1A) for molding the containers or the bodies of the containers (in which case the mold also comprises a third part or mold bottom comprising a hollow impression corresponding to the bottom of the container that is to be manufactured).

In the closed position depicted in FIG. 1A, the mating faces of the two mold halves 2a, 2b define a parting plane 5 which is shown in chain line.

Actuating means which, in general, involve link rods coupled respectively to the two mold halves, allow the mold halves to be moved between their closed position and their open position and allow them to be held in these positions. Control means, generally in the form of rollers and cams, allow these actuating means to be controlled according to operating sequences. Concrete examples of these will be given later on in conjunction with certain preferred embodiments of the invention.

In a traditional configuration of mold of the aforementioned type, the mold halves occupy positions that are symmetric with respect to the parting plane, irrespective of their functional position; in other words, they are moved symmetrically one on each side of the parting plane.

Figure 1B:
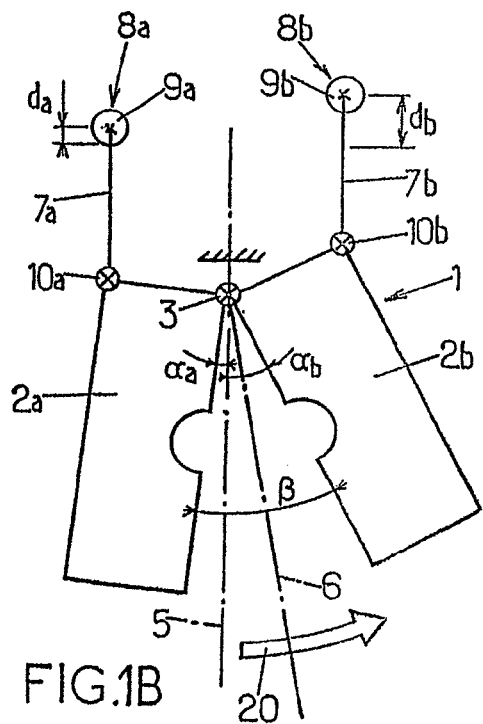
FIGS. 1B and 1C are depictions similar to that of FIG. 1A, showing the mold, when it belongs to a rotary device of the carousel type, in two different functional positions.

To make it easier to introduce container parisons (particularly preforms) when loading the molds and to extract the finished containers when unloading the molds, particularly when using transfer arms of simplified design which have fewer degrees of freedom than the arms hitherto used (and in which in particular the end grippers do not move strictly along the line of the parting plane between the two mold halves) but by contrast are simpler to control and less expensive, the invention proposes, as illustrated in FIG. 1B, for the two mold halves 2a, 2b to be opened asymmetrically on each side of the parting plane 5, by virtue of which measure the most wide open mold half leaves more space with respect to the parting plane 5 for the introduction into the mold of an auxiliary member such as a gripper arm. Thus, in the example of FIG. 1B, the angle $\alpha_b$ of opening of the mold half 2b with respect to the parting plane 5 is greater than the angle $\alpha_a$ of opening of the mold half 2a with respect to the parting plane, whereas the opposite is the case in the example of FIG. 1C.

However, it is desirable to keep the same mutual angle of opening β of the two mold halves 2a, 2b as is found in current molds, which means that the solution proposed by the invention is equivalent to a pivoting of the bisecting plane 6 (depicted in double-dot chain line in FIG. 1B) of the two mold halves 2a, 2b. This measure makes it possible to maintain the same parameters, particularly the same times, for controlling the opening and closure of the mold as are found currently, which means that the mold operating conditions are unchanged by implementing the provisions of the invention. There are various conceivable technical solutions for bringing about the desired asymmetric movement of the two mold halves. All the solutions proposed hereinafter call upon mold half actuating means that involve two link rods coupled to the two mold halves respectively.

A first embodiment illustrated in FIG. 1A employs two link rods 7a, 7b which are independent of one another, coupled, at one of their ends, to the two mold halves 2a, 2b respectively by two respective articulated links 10a, 10b and, at their other end, to respective individual controls 8a, 8b. These controls may, for example, consist of respective rollers 9a, 9b which are mounted to turn freely at the respective ends of the link rods 7a, 7b and which collaborate with respective cams (not depicted) which can move if the molding device is fixed or are fixed if the molding device can move. The link rods 7a, 7b may, for example, run approximately parallel to one another and to the parting plane 5 and the controls 8a, 8b are designed to move the link rods 7a, 7b longitudinally (arrows 11a and 11b respectively).

The embodiment that has just been described is the one which offers the greatest number of options for any desired form of actuation of the two mold halves 2a, 2b both in terms of time and in terms of angle.

Thus, FIG. 1B illustrates a control configuration that opens the mold half 2b through an angle, measured with respect to the parting plane 5, which is larger than the angle through which the mold half 2a is opened with respect to this parting plane 5, because the travel $d_b$ of the control 8b is longer than the travel $d_a$ of the control 8a.

Figure 1C:
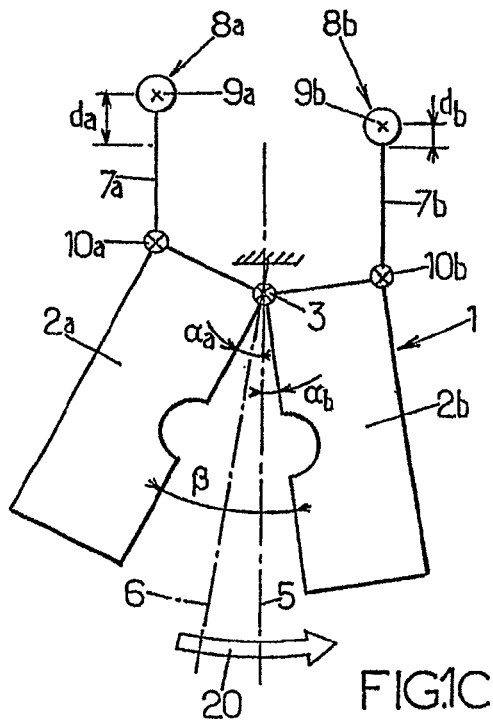

Likewise, FIG. 1C illustrates a control configuration that causes the mold half 2a to be opened through an angle, measured with respect to the parting plane 5, which is larger than the angle through which the mold half 2b is opened with respect to this parting plane 5, because the control 8b has a travel $d_b$ that is shorter than the travel $d_a$ of the control 8a.

However, in spite of the advantages afforded by the technical solution that has just been explained in terms of control options, this solution entails doubling up on the control means and this requires more equipment and is therefore expensive; this solution also leads to a greater bulk because of this very doubling up on the control means (particularly on the roller guide cams).

This being the case, a second embodiment may be preferred because of the savings on equipment and space that it has to offer. In this configuration, recourse is had to two link rods 7a, 7b which are coupled to one another in an articulated manner at 12 at their free end, in an arrangement that is conventional in this type of device except that here, one of the link rods (in this instance the link rod 7b) is made shorter than the other (in this instance the link rod 7a).

In addition, the path (denoted by the reference 13) of the common axle 12 is external to the parting plane, which means that the mold half 2b (in FIG. 2B) driven by the shorter link rod 7b has an angle of opening $\alpha_b$, with respect to the parting plane 5, which is larger than that $\alpha_a$ of the other mold half 2a, as shown in FIG. 2B.

In this configuration, drive means for driving said common axle 12 are able to move the latter in a path 13 running approximately parallel to the parting plane 5, as depicted in FIG. 2B; the path 13 of the common axle 12 is external to the parting plane 5, the mold half 2b driven by the shorter link rod 7b having an angle of opening $\alpha_b$, with respect to the parting plane, which is larger than that $\alpha_a$ of the other mold half 2a. For preference, the drive means comprise a drive arm 14 running approximately transversely to the parting plane 5 and this drive arm 14 has a first end articulated to a fixed axle 15 and an opposite second end articulated to said axle 12 common to the aforesaid link rods 7a, 7b so that the path 13 of the axle 12 is an arc of a circle running, on the whole, approximately parallel to the parting plane 5.

As regards the control means 16 for instigating the rotational movement of the arm 14, these may, for example, involve a roller 17 supported by a secondary arm 19 secured to the arm 14 and able to collaborate with a cam (not depicted) to cause the arm 14 to move (arrow 18) rotationally about the axle 15.

In the proposed arrangement with two link rods 7a, 7b of unequal lengths, the movement of the common axle 12 along the path 13 causes the two mold halves 2a, 2b to rotate simultaneously, but through different angles: the angular travel of the mold half coupled to the shorter link rod is greater than the angular travel of the mold half coupled to the longer link rod. In the example of FIG. 2B, the angle $\alpha_b$ through which the mold half 2b coupled to the shorter link rod 7b travels in a curve is greater than that $\alpha_a$ of the mold half 2a coupled to the longer link rod 7a.

When, on the other hand, it is desirable for it to be the mold half 2a that has an angular travel $\alpha_a$ greater than that $\alpha_b$ of the mold half 2b, all that is required, as illustrated in FIG. 2C, is to switch the position of the drive arm 14, of the shorter link rod which becomes the link rod 7a, and the position of the path 13 of the axle 12 with respect to the parting plane 5.

It must be emphasized that, in this second embodiment, the arrangements of the mold, of the actuating arm 14 and of the control means 16 remain approximately identical to their status in the current conventional configuration, and that the alteration afforded by the invention relates to the shortening of one of the two link rods.

Figure 3A:
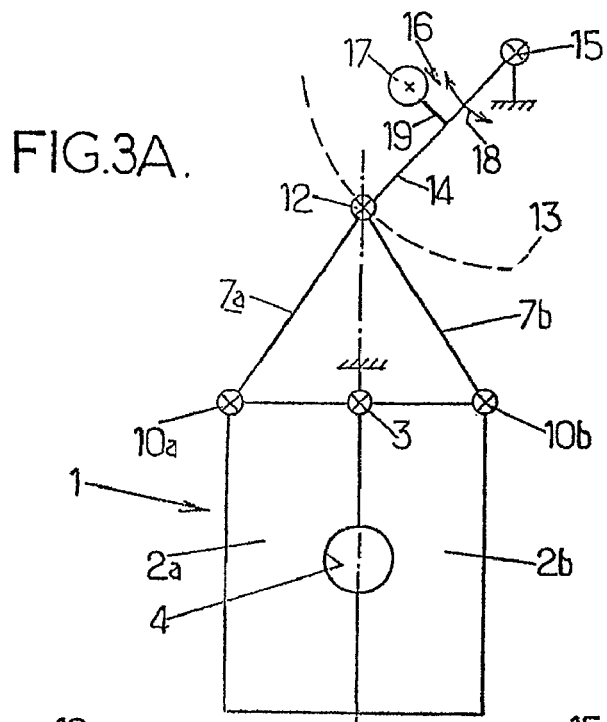
FIG. 3A is a highly schematic depiction, in a view from above, of a third embodiment of a molding device arranged according to the invention.

A third embodiment, illustrated in FIG. 3A, involves the use of two link rods 2a, 2b of equal length coupled to one another in an articulated fashion at an axle 12 at their free end, in an arrangement that is conventional in this type of device.

What is more, the path (denoted by the reference 13) of the common axle 12 is transverse to the parting plane. In other words, the common axle 12 can move in a direction that is inclined with respect to the parting plane, the angle of this inclination being related to the asymmetry of opening of the two mold halves 2a, 2b on each side of the parting plane 5. Thus, when the axle 12 common to the two link rods 7a, 7b is moved in its path 13 to the left in FIG. 3B, the mold half 2b is driven by the link rod 7b through an angle $\alpha_b$, with respect to the parting plane 5, which is larger than that $\alpha_a$ of the other mold half 2a.

Figure 3B:
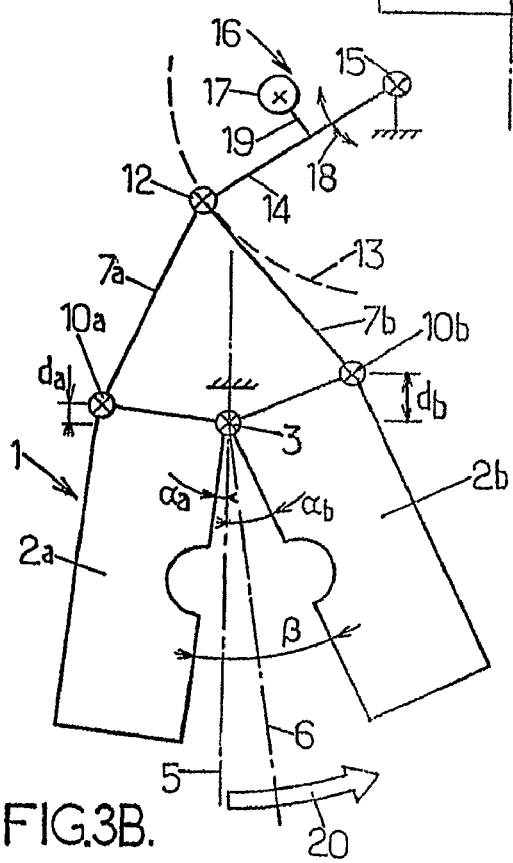
FIGS. 3B and 3C are depictions similar to that of FIG. 3A, showing the mold, when it belongs to a rotary device of the carousel type, in two different functional positions.

In this configuration, means for driving said common axle 12 are able to move this axle in a path 13 running transversely to the parting plane 5, as depicted in FIG. 3B; the path 13 of the common axle 12 intersects the parting plane 5. For preference, the drive means comprise a drive arm 14 running approximately transversely to the parting plane 5 and this drive arm 14 has a first end articulated to a fixed axle 15 and an opposite second end articulated to said common axle 12 of the aforesaid link rods 7a, 7b, so that the path 13 of the axle 12 is an arc of a circle intersecting the parting plane 5.

As far as the control means 16 for rotating the arm 14 are concerned, these may, for example, once again involve a roller 17 supported by a secondary arm 19 secured to the arm 14 and able to collaborate with a cam (not depicted) to cause the arm 14 to rotate (arrow 18) about the axle 15.

Figure 3C:
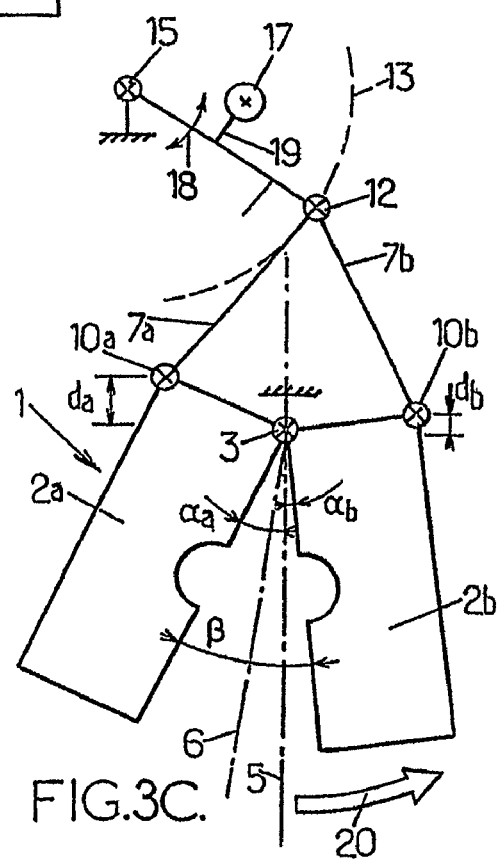

When, on the other hand, it is desirable for it to be the mold half 2a that has an angular travel $\alpha_a$ greater than that $\alpha_b$ of the mold half 2b, all that is required, as illustrated in FIG. 3C, is to switch the position of the drive arm 14 and the position of the path 13 of the axle 12 with respect to the parting plane 5.

It must be emphasized that, in this third embodiment, the mold and the link rods retain their current classical structure and the provisions afforded by the invention relate to the drive arm 14 and to the control means 16 in such a way that the path 13 of the axle 12 runs transversely to the parting plane 5.

Whatever the embodiment envisioned, the arrangements according to the invention and which have just been explained in detail with reference to FIGS. 1A-1C, 2A-2C and 3A-3C can find an especially beneficial application in molding devices produced in the form of rotary devices of the carousel type, which combine several molding devices distributed about the periphery of a rotary base. Carousels arranged in this way are well known in the art and there is no need to describe them in detail here. FIGS. 1A-1C, 2A-2C and 3A-3C do not show any structural element thereof and illustrate only the single feature that is of benefit in the context of the invention, namely the direction of rotation of the carousel depicted schematically by an arrow 20. It must also be emphasized that, in general, the parting plane 5 of each mold 1 of the carousel runs substantially radially (the center of rotation of the carousel is not shown in the figures).

In this context, provision may be made for it to be the rear mold half (considered in the direction 20 in which the carousel rotates), namely the mold half 2a, which has an angle of opening $\alpha_a$, with respect to the parting plane 5, which is greater than that $\alpha_b$ of the other mold half 2b. This configuration is shown in FIGS. 1C, 2C and 3C. It may be useful in particular to make it easier to load the mold with a parison (such as a preform) from a loading wheel equipped with moving loading arms, particularly arms of simplified structure in which the end gripper cannot be moved, at least over part of its travel, precisely radially within the mold.

Conversely, provision may also be made for it to be the front mold half (considered in the direction 20 in which the carousel rotates), namely the mold half 2b, which has an angle of opening $\alpha_b$, with respect to the parting plane 5, which is greater than that $\alpha_a$ of the other mold half 2a. This configuration is illustrated in FIGS. 1B, 2B and 3B. It may be useful in particular to make it easier to extract a finished container from the mold, for example to grasp it and move it using an unloading arm of an unloading wheel, particularly when using an arm of simplified structure in which the end gripper cannot be moved, at least over part of its travel, exactly radially within the mold.

Of course, in the first and third embodiments, the preceding two arrangements can be combined sequentially so that each mold of the carousel, in two angularly shifted positions in the rotary travel of the carousel, undergoes an opening operation in which the rear mold half is opened wider for loading the parison, then an opening operation in which the front mold half is opened wider for extracting the finished container. To this end, all that is required, in the first embodiment, is for the control cams controlling the two rollers 9a, 9b to be configured accordingly; in the third embodiment, all that is required is for each drive arm 14 to be equipped with two separate rollers 17 arranged as shown in FIGS. 1C and 1B or 3C and 3B and able functionally to collaborate with two separate respective cams.

What is claimed is:

1. A molding device for manufacturing thermoplastic containers by blow-molding or stretch-blow-molding heated parisons, said molding device comprising at least one blow-molding mold of the hinged mold type with at least two mold halves which can be separated from one another by rotation about a common axle of articulation under the action of actuating means;
   wherein the actuating means are designed in such a way that the two mold halves have respective angles of opening on each side of the parting plane of said mold which are not equal;
   wherein the actuating means comprise two link rods having first ends rotationally connected by links respectively to said two mold halves and second ends rotationally connected at a common axle and control means capable of moving said common axle in a path running approximately parallel to the parting plane;
   wherein said two link rods have different lengths and in that the path of the common axle is external to the parting plane, the mold half driven by the shorter link rod having an angle of opening, with respect to the parting plane, which is larger than that of the other mold half.

2. The molding device as claimed in claim 1, wherein the control means comprise a drive arm running transversely to the parting plane and wherein said drive arm has a first end articulated to a fixed axle and an opposite second end articulated to said axle common to the aforesaid link rods.

3. A molding device for manufacturing thermoplastic containers by blow-molding or stretch-blow-molding heated parisons, said molding device comprising at least one blow-molding mold of the hinged mold type with at least two mold halves which can be separated from one another by rotation about a common axle of articulation under the action of actuating means;
   wherein the actuating means are designed in such a way that the two mold halves have respective angles of opening on each side of the parting plane of said mold which are not equal;
   wherein the actuating means comprise two link rods of substantially the same length and having respective first ends rotationally connected by links to the two mold halves respectively and opposite second ends rotationally connected at a common axle, control means being functionally associated with said common axle in order to move it,
   wherein said control means for controlling the common axle are designed to drive said common axle in a path running approximately transversely to the parting plane and inclined at an angle with respect thereto, the angle of inclination of this path being related to the asymmetry of opening of the two respective mold halves.

4. The molding device as claimed in claim 3, wherein the control means comprise a drive arm running approximately transversely to the parting plane but inclined at an angle with respect thereto, and wherein said drive arm has a first end articulated to a fixed axle and an opposite second end articulated to said axle common to the aforesaid link rods.

5. The molding device as claimed in claim 1, built in the form of a rotary device of the carousel type moving in a direction of rotation, the parting plane of the mold running substantially radially, wherein it is the rear mold half (considered in the direction in which the carousel rotates) which has an angle of opening, with respect to the parting plane, which is greater than that of the other mold half.

6. The molding device as claimed in claim 1, built in the form of a rotary device of the carousel type moving in a direction of rotation, the parting plane of the mold running substantially radially, wherein it is the front mold half (considered in the direction in which the carousel rotates) which has an angle of opening, with respect to the parting plane, which is greater than that of the other mold half.

7. The molding device according to claim 1, wherein the thermoplastic containers are PET containers.

8. The molding device according to claim 3, wherein the thermoplastic containers are PET containers.

9. The molding device as claimed in claim 3, built in the form of a rotary device of the carousel type moving in a direction of rotation, the parting plane of the mold running substantially radially, wherein it is the rear mold half (considered in the direction in which the carousel rotates) which has an angle of opening, with respect to the parting plane, which is greater than that of the other mold half.

10. The molding device as claimed in claim 3, built in the form of a rotary device of the carousel type moving in a direction of rotation, the parting plane of the mold running substantially radially, wherein it is the front mold half (considered in the direction in which the carousel rotates) which has an angle of opening, with respect to the parting plane, which is greater than that of the other mold half.

11. A molding device for manufacturing thermoplastic containers by blow-molding or stretch-blow-molding heated parisons, the molding device comprising:
   a blow-molding mold comprising two mold halves rotatable about a common hinge, wherein a seam between the two mold halves when the two mold halves are in a closed position defines a parting plane; and
   an actuator for opening the two mold halves, the actuator comprising:
      two link rods having a different length, each of the two link rods having a first end rotationally connected to a respective one of the two mold halves, and each of the two link rods having a second end rotationally connected at a common axle to each other; and a controller configured to move the common axle of the two link rods in a path running approximately parallel to and spaced apart from the parting plane of the two mold halves;

wherein, when the controller moves the common axle, the mold half connected to the shorter link rod opens with a larger angle of opening with respect to the parting plane than the mold half connected to the longer link rod, thereby opening the molds asymmetrically.

12. A molding device for manufacturing thermoplastic containers by blow-molding or stretch-blow-molding heated parisons, the molding device comprising:

a blow-molding mold comprising two mold halves rotatable about a common hinge, wherein a seam between the two mold halves when the two mold halves are in a closed position defines a parting plane; and an actuator for opening the two mold halves, the actuator comprising:

two link rods having a same length, each of the two link rods having a first end rotationally connected to a respective one of the two mold halves, and each of the two link rods having a second end rotationally connected at a common axle to each other; and a controller configured to move the common axle of the two link rods in a path transverse to and at an inclination angle with respect to the parting plane of the two mold halves;

wherein, when the controller moves the common axle, the two mold halves open substantially asymmetrically, the inclination angle relating to an amount that the two mold halves open asymmetrically.

* * * * *